United States Patent Office 3,366,490
Patented Jan. 30, 1968

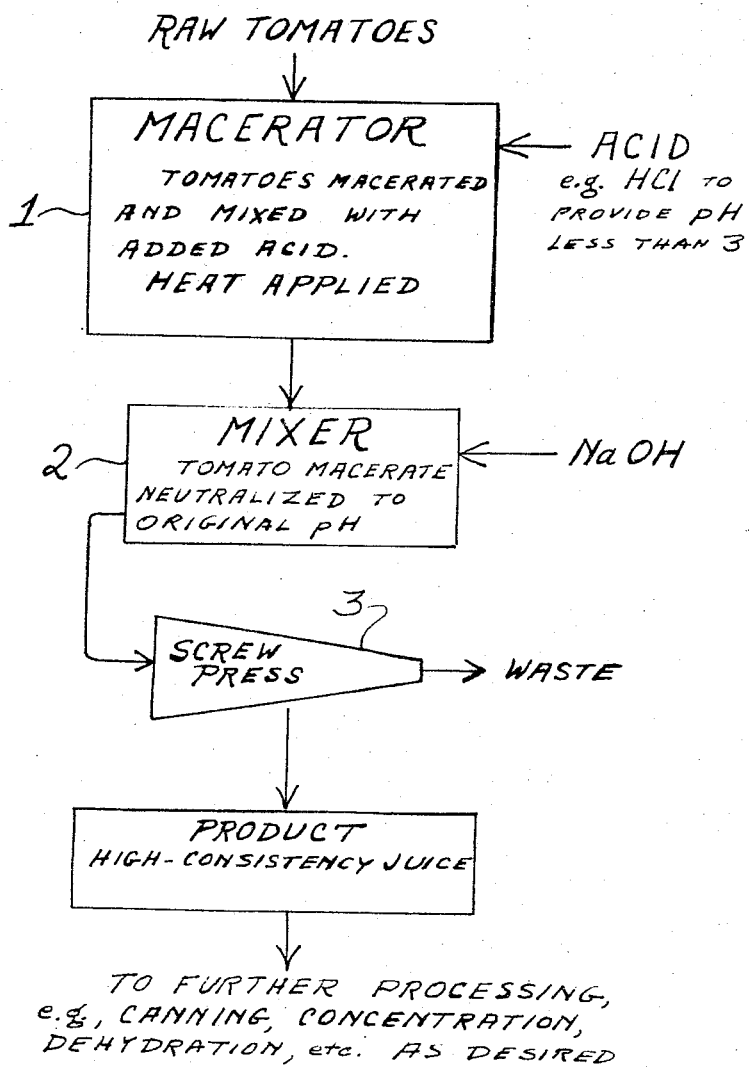

3,366,490
PREPARATION OF HIGH-CONSISTENCY
TOMATO JUICE
Joseph R. Wagner, Moraga, Jackson C. Miers, Pleasant Hill, and Horace K. Burr, El Cerrito, Calif., assignors to the United States of America as represented by the Secretary of Agriculture
Continuation-in-part of application Ser. No. 439,488, Mar. 12, 1965. This application Nov. 4, 1966, Ser. No. 626,364
13 Claims. (Cl. 99—105)

A nonexclusive, irrevocable, royalty-free license in the in the invention herein described, throughout the world for all purposes of the United States Government, with the power to grant sublicenses for such purposes, is hereby granted to the Government of the United States of America.

This application is a continuation-in-part of our co-pending prior application Ser. No. 439,488, filed Mar. 12, 1965, now abandoned.

This invention relates to and has among its objects the provision of novel processes for preparing tomato juice of high consistency. Further objects of the invention will be evident from the following description wherein parts and percentages are by weight unless otherwise specified.

The annexed drawing is a flow sheet illustrating application of the process of the invention.

It is recognized in the industry that consistency is an important attribute of tomato juice. In particular, higher consistency represents better quality. It is to be especially noted that consistency has no fixed relationship with solids contents so that whereas two lots of tomato juice prepared by different procedures and/or different raw materials may have identical solids contents, their consistencies may be radically different. The matter of consistency is not only important with regard to tomato juice per se but also with regard to products prepared therefrom such as concentrated juice, pastes, sauces, ketchups, etc. In all these products a higher consistency signifies better quality and to attain such quality it is necessary that the juice employed as the starting material be of high consistency.

Those familiar with the art are aware that consistency of tomato juice may be controlled to some extent by the method of manufacturing the juice, particularly by choice of the cold-break method or the hot-break method. In the cold-break method, raw tomatoes are macerated at ambient temperatures and the resulting pulp is pressed through perforated sheet metal or wire mesh screens to separate the juice from the seeds, skins, cores, etc. This process yields a juice of relatively low consistency due, it is believed, to degradation of pectin-containing colloids by enzymes such as pectinesterase and polygalacturonase which naturally occur in the fruit. In the hot-break method, the same mechanical steps are used but in addition heat is applied, i.e., the tomatoes—during maceration or immediately after they are broken up—are quickly heated to a temperature of 185° F. or higher so as to inactivate the enzymes responsible for the loss of consistency. The juice obtained in this technique has a higher consistency than that produced by the cold-break system and thus the hot-break procedure is generally preferred in industry.

Application of the techniques of the present invention provides advantages over those attainable with the known processes. As an example, the process of the invention may be applied in conjunction with the known hot-break method whereby to yield a juice of substantially higher consistency than obtained with the usual hot-break system. Moreover, although the procedure of the invention is preferably applied in conjunction with hot-break systems, it can also be advantageously applied in cold-break systems. In such case the juice product will have a higher consistency than obtained with the standard cold-break system though it is not claimed that the consistency will be as high as where the invention is applied in conjunction with heat. One advantage of utilizing the invention in conjunction with the cold-break method is that it can be practiced in a plant having equipment designed for operation at ambient temperatures and the modification will permit production of juice of consistently high consistency.

In accordance with the invention, the basic step to achieve a juice of increased consistency involves macerating raw tomatoes in the presence of added acid. The verb "macerate" is employed herein—in common with its usage in the art—to denote application of mechanical action to break up or subdivide the tomatoes into a pulpy mass.

For use as the added acid, we prefer hydrochloric acid because it is effective, inexpensive, and particularly because eventual neutralization of the product (with sodium hydroxide) yields sodium chloride—a common additive in tomato products. The hydrochloric acid may be added as such or in the form of hydrogen chloride gas. Moreover, acids other than hydrochloric can be employed as the primary consideration is the establishment of a low pH. Thus, for example, one may employ such strongly-ionized acids as sulphuric, orthophosphoric, metaphosphoric, and pyrophosphoric. Weaker acids such as tartaric or citric may also be used. However, though effective, these weaker acids are not preferred because large proportions are required to attain the necessary reduction in pH. Acetic acid is too weakly-ionized to be of any practical usefulness. In view of the above considerations, generically one may employ any acid which is more strongly ionized than acetic (i.e., has an ionization constant greater than $1.86 \times 10^{-5}$) and which is nontoxic. It is, of course, within the scope of the invention to use mixtures of two or more acids, for example, a mixture of hydrochloric and any of the phosphoric acids.

In general, it has been observed that addition of enough acid to establish a pH in the macerate of less than 3.5 will provide an increase in consistency over that attained in the absence of added acid. Moreover, as the pH is reduced below the aforesaid level, greater increases in consistency are achieved. It has also been observed that as the pH is reduced below about 2, little if any further increase in consistency is attained. Thus, whereas the pH may be decreased to very low levels, there is no practical purpose gained by going below a pH of 1. Usually, we prefer to operate at a pH range of about 2.5 to about 3.0—particularly in a system where maceration is conducted hot—whereby a large increase in consistency is achieved without requiring excessive amounts of added acid. As noted hereinabove, the primary consideration of the added acid is to establish a reduced pH. However, there is some variation in effect between different acids applied at the same pH and this is particularly noticeable with metaphosphoric acid which provides a virtually maximum increase in consistency at a pH of 2.97.

Although reduction in pH, as described above, is the critical factor to produce juices of increased consistency, there will be variation in the level of consistency attained at any given pH, depending on such factors as the nature of the tomatoes being treated, the temperature at which the treatment is carried out, and—if a heated system is used—the rate at which the material is heated. For example, at the same pH a hot-break procedure will usually yield a product of higher consistency than will a cold-break procedure. Moreover, within the realm of hot-break procedures, a product of especially high consistency will be attained where the treatment is conducted under conditions to attain a rapid comminution and heating of the acidified tomato material. In view of the above explanation of the influence of heat, it is evident that if one is aiming at producing a juice that exhibits a particular degree of consistency increase, one would correlate the type of process with pH level used. For example, if the cold-break system were chosen one would use a lower pH than would be the case were the processing done by the hot-break system.

As noted above, the benefits of the invention are achieved by macerating the raw tomatoes in the presence of added acid. The primary action of this maceration step is to break up the fruit and mix it with the acid so that there is intimate contact between the acid and the tomato material, including both liquid and cellular particles. In order to achieve the desired result of a high-consistency juice, it is necessary that the acid be present at the time the tomato structure is broken up and for this reason it is preferred to add the acid to the tomatoes while they are still whole or at most after they have been cut into pieces. When this is done, the acid contacts the particles of tomato material as these particles are formed by the comminution of the fruit. As a result, the enzymes and enzyme substrates released by the disorganization of natural structure have little or no opportunity to react. On the other hand, were the tomatoes to be broken up as such and then mixed with acid, substantial loss of consistency would occur because of the interaction of released enzymes and enzyme substrates before the acid could do its work. The effect of the acid is rapidly realized so that the maceration need only be conducted for a short period of time, e.g., about from 10 seconds to 5 minutes, depending mainly on the efficacy of the equipment used to effectuate the maceration. For production of juice of maximum consistency the macerate is heated to a temperature of at least 185° F., preferably about 200° F. The heating may be applied after completion of maceration but, preferably, heat is concomitantly applied as the tomatoes and added acid are subjected to maceration. At any rate, after the tomatoes have been broken down to a pulp and intimately mixed with the acid, with or without heating, the pulp without any delay is passed through conventional equipment to separate the juice from the skins, seeds, cores, etc. It is a noteworthy advantage of the invention that, in general, the amount of this waste (skins, etc.) is less, as much as 40–50% less, than that with conventional juice production. Another noteworthy advantage of the invention is that the desired enzyme inactivation is attained by the addition of a single chemical—a simple acid—and no other substances are required.

It is obvious that addition of the acid will produce a juice of excessively sour taste. Accordingly, the product is neutralized to its normal pH (usually in the range 3.8–4.2) by incorporation of sodium hydroxide. Other alkaline materials such as sodium carbonate or bicarbonate may be used but are not preferred because of their foaming effect (caused by release of $CO_2$). The neutralization can be applied to the juice or, preferably, to the macerate prior to passing it to the juice extractor. In the event that a cold-break system is used, the juice (or macerate) should be heated to an enzyme-inactivating temperature (185 to 212°) before application of the neutralization step. Such heating will prevent loss of consistency when the effect of the added acid is canceled by the neutralization.

A particular advantage of the invention is that it can be applied to conventional juice production lines with but minor changes. Thus standard juice production involves a maceration of the fruit at an early stage in the line and the acid can be introduced into the macerating device with conventional metering equipment. For the neutralization one need only provide a mixer and a device for introducing alkaline material at the appropriate rate whereby the macerate (or the juice) is brought to its original pH. It may be noted that such changes in the standard production pattern do not contribute any interference with flow of the tomato material through the system. Thus addition of the acid does not interfere with or prolong the maceration step and the neutralization step likewise does not cause any delay in transferring the pulp (from the macerator) to the juice extracting step. A typical adaptation of a standard continuous juice production line to operate in accordance with the process of the invention is illustrated in the flow sheet in the drawing annexed hereto.

Referring to the flow sheet, raw tomatoes are continuously fed at a predetermined rate into macerator 1 together with a flow of acid metered to provide the proper pH. In macerator 1 the tomatoes are rapidly comminuted and intimately mixed with the acid and concomitantly heated to about 200° F. The resulting macerate flows to mixer 2 wherein it is blended with a stream of sodium hydroxide solution metered to restore the macerate to its natural pH level. The neutralized macerate is then directed to screw press 3 to separate the juice from the skins, seeds, etc. The juice issuing from the screw press may then be processed in known manner to produce canned juice, concentrated or dehydrated products, etc.

Tomato juice prepared in accordance with the invention may be processed in conventional manner. For example, it may be canned as a single-strength juice or it may be first concentrated to a paste or puree and canned in such state. It may be used, in single strength or concentrated form, in the preparation of soups, sauces, ketchups, preserves, aspic products, etc. Also it may be converted into solid dehydrated products by such known techniques as concentration followed by foam-mat or vacuum dehydration or by spray drying. It is an important feature of the invention that the color, flavor, and nutrient value of the juice are not impaired so that it is suitable for all the uses for which conventional tomato juice is adapted.

Since the process of the invention produces a high-consistency juice, this product can be blended with conventional juices (ones of lower consistency) to provide a composite juice of intermediate consistency as may be required for a particular application. As an example of such procedure, a juice processing line may be operated for a first period of time in conventional manner and operated for a second period of time with application of the process of the invention, the two juices being then combined to yield the final product. By varying the relative duration of the first and second periods, products of a wide range of consistency can be produced.

The invention is further demonstrated by the following illustrative examples. The explanatory notes in Paragraphs A through E, below, concern Examples I to IV.

(A) The macerating and blending operations referred to in the examples were carried out in a large "Waring Blendor" equipped with a 1-gallon bowl and a rotating blade assembly in the base of the bowl to cut and blend the material contained therein. Where the material was to be concomitantly heated, a steam-heated coil was inserted in the bowl in contact with the material undergoing treatment.

(B) In all the examples, except Example II, the following procedure was applied: After maceration and blending, with or without application of heat, the juice was extracted from the macerate by passing the latter through a tapered screw-type extractor provided with a perforated metal screen (0.033 inch perforations).

(C) Consistency of the juice products was determined at 25° C. (77° F.) by measuring the time required for 96 ml. of the liquid to pass through the 3.3 mm. (I.D.) orifice of a 100-ml. pipette. With this test, a longer flow time reflects a higher consistency.

(D) For the products of higher solids content, a viscosity measurement was made as follows: Using a Stormer viscosimeter fitted with a lightweight opened spiral spindle, a determination was made of the weight required to revolve the spindle 100 times in 30 seconds when the spindle was immersed in the sample at 25° C. (77° F.). In this determination, a greater weight indicates a higher viscosity.

(E) In various of the examples, runs not representing the process of the invention were included for purposes of comparison.

*Example I.—Effect of added HCl in preparing cold-break and hot-break juice*

Four kg. of ripe T–2 variety tomatoes were subdivided into four comparable 1-kg. lots by quartering each fruit and distributing the quarters to the four lots. Each lot was then treated as follows:

Lot 1: Macerated and blended at room temperature for 1.5 minutes.

Lot 2: Eighteen ml. of concentrated hydrochloric acid were added to the tomatoes; maceration and blending at room temperature was then applied for 1.5 minutes.

Lot 3: Macerated and blended, initially at room temperature for 10 seconds then with a steam coil in the system for an additional 102 seconds to bring the macerate to 203° F.

Lot 4: Same treatment as with lot 3 except that 18 ml. of concentrated hydrochloric acid was added to the tomatoes before initiating the process.

Immediately following the above treatments, each lot was separately passed through the extractor. The juice from each lot was brought to 25° C. (77° F.) and tested for consistency, density, and pH. The results are tabulated below:

TABLE I

| Treatment | Lot 1 Cold-break | Lot 2 Cold-break | Lot 3 Hot-break | Lot 4 Hot-break |
|---|---|---|---|---|
| Acid added (ml. conc. HCl per kg.) | None | 18 | None | 18 |
| Consistency, sec | 24.4 | 57.2 | 22.4 | 97.6 |
| Density, deg. Brix | 5.5 | 6.5 | 5.9 | 6.6 |
| pH | 4.22 | 1.08 | 4.10 | 1.04 |

It is evident from the above data that the acidification improved the consistency of both the cold-break juice (lot 2 vs. lot 1) and the hot-break juice (lot 4 vs. lot 3) and that the combination of acidification plus hot break (lot 4) provided the highest consistency.

The acidified hot-break juice (lot 4) was restored to the natural pH level (4.2) by addition of sodium hydroxide. Consistency of the neutralized juice was 117 sec., proving that the high consistency of the acidified hot-break product was a stable property.

In the case of the acidified cold-break juice (lot 2), direct neutralization (to a pH of 4.2 with NaOH) caused a sharp drop in consistency to 19 sec. This loss in consistency could, however, be prevented by heating the juice to an enzyme-inactivating temperature (185–212° F.) prior to its neutralization.

*Example II.—Preparation of tomato paste*

A quantity of sound Ace tomatoes was subjected to washing and trimming and then divided into two 200-lb. lots.

The first lot was put through a pulper (about 20 min. feeding time) equipped with a 0.033″ screen. The juice was pumped from the pulper at 11 lb. per min. through a "Votator" heat exchanger which heated it to 210±4° F., then through a second "Votator" which cooled it to 138° F. Finally the juice was collected in a water-cooled pot in which it was cooled to 85° F.

The second lot of tomatoes was subdivided into 3-kg. batches. Each batch was macerated and blended with 54 ml. of conc. hydrochloric acid for about 25 seconds. The macerates were combined and this composite macerate was put through the pulper and heated and cooled exactly as with lot 1. The pH of the juice was 1.03. A 12 N solution of sodium hydroxide was slowly added to the juice until its pH was 4.42 (1350 ml. of NaOH solution was required).

Samples of the control juice (lot 1) and of the juice of lot 2 (before and after neutralization) were collected during processing for consistency measurements. The data are tabulated below:

TABLE IIA

| | Lot 1 (Control) | Lot 2 Acidified | Lot 2 Acidified and neutralized |
|---|---|---|---|
| Density, deg. Brix | [1] 4.5 | [2] 5.2 | [3] 6.0 |
| Consistency, sec | 22.1 | 109 | 99 |

[1] At 25° C.
[2] At 29.5° C.
[3] At 28.5° C.

Both lots of juice were then treated as follows: Evaporated in a vacuum pan at about 82° F. to a paste (20–24° Brix). The paste was heated to 195–200° F. poured hot into No. 2½ cans, sealed immediately and put into boiling water for 3 minutes to sterilize the cans, cooled in running water to room temperature and put in storage at 34° F.

After one month storage at 34° F., the cans of tomato paste were removed from storage and the pastes diluted to various densities and the viscosity of each diluted product measured. To correct for the salt present in the product of lot 2 (derived from the acidification and neutralization), each dilution was made to a designated level based on the content of soluble tomato solids. The results are tabulated below:

TABLE IIB

| | Stormer Viscosity | |
|---|---|---|
| | Lot 1 (Control) | Lot 2 (Acidified and neutralized) |
| Soluble tomato solids, ° Brix: | | |
| 16 | 72 | 254 |
| 15 | 62 | 216 |
| 12 | 35 | 97 |
| 10 | 25 | 54 |

*Example III.—Effect of different pH's*

A series of runs were made in which comparable samples of tomatoes (Ace variety) with varying amounts of hydrochloric acid to provide different pH's (as indicated below) were macerated and blended, initially for a few seconds at room temperature, then with application of the steam-heated coil for 2.5 minutes to bring the macerate to a temperature of 200° F. The macerates were then put through the extractor. The results are tabulated below:

TABLE III

| Run | pH of Macerate | Consistency of juice, Sec. |
|---|---|---|
| 1 | 3.4 | 24 |
| 2 | 2.85 | 26 |
| 3 | 2.40 | 76 |
| 4 | 2.20 | 144 |
| 5 | 1.40 | 164 |
| 6 | 0.94 | 170 |

*Example IV.—Use of various acids (other than HCl)*

The procedure of Example III was repeated using various acids in place of the hydrochloric acid. The results are given below:

TABLE IV

| Run | Acid used | pH of Juice | Consistency of juice, Sec. |
|---|---|---|---|
| 1 | None | 4.3 | 25 |
| 2 | Orthophosphoric | 1.75 | 144 |
| 3 | Sulphuric | 1.87 | 145 |
| 4 | Metaphosphoric | 2.97 | 142 |

*Example V*

These runs demonstrate the superior results achieved by using a fast heating schedule. To achieve this, a "drop-in" technique was used, that is, a heated (200° F.) pool of tomato juice was provided to serve as a direct-contact heating medium. Tomatoes were fed into this pool in portions, together with acid necessary to provide a desired pH level, while applying macerating action and heating to maintain the system at 200° F. Because of the intimate contact with the hot juice, the entering tomato material was very rapidly brought up to the desired temperature. More particulars of the procedure used are given below:

The runs were carried out employing a large "Waring Blendor" equipped with a 1-gallon bowl and a rotating blade assembly in the base of the bowl to cut and blend the material contained therein. A steam coil was also provided for heating the material in the bowl.

At the beginning of each run, 500 grams of previously-prepared tomato juice was adjusted to the same pH as was to be employed in the run, using the same acid designated for the run. This juice was placed in the blendor and heated to 200° F. and maintained at that level throughout the run while rotating the blade continuously.

A 1-kg. lot of fresh tomatoes (cut into quarters) was divided into four portions and these portions were fed into the hot juice at about 15 second intervals, together with an appropriate aliquot of the acid used in the run. At about 2 minutes from the start of the run, heating was discontinued (by removing the steam coil from the bowl) but operation of the blade was continued to complete breakdown of any fragments of intact tissue. At 3 minutes from the start of the run the macerate was put through a pulper to separate the juice from the skins, seeds, etc. and the juice was cooled. It was then tested for pH and consistency.

The juice used as the heated liquid for the runs was a conventional juice. It was prepared by macerating raw tomatoes at their natural pH without any additives, heating to 200° F. to destroy enzymes, and extraction of the juice from the macerate with a conventional pulper.

The results are tabulated below:

| Run | Acid added | pH | Consistency of juice [1] (Pipette 1) Seconds | (Pipette 2) Seconds |
|---|---|---|---|---|
| 1 | None | 4.25 | 107 | 49 |
| 2 | Citric | 3.28 | 138 | 65 |
| 3 | do | 2.77 | 350 | 164 |
| 4 | Hydrochloric | 3.20 | 199 | 78 |
| 5 | do | 2.69 | 518 | 213 |
| 6 | do | 1.01 | 514 | 226 |
| 7 | Tartaric | 3.28 | | 73 |
| 8 | do | 2.75 | | 204 |

[1] Consistency (Pipette 1) was determined at 25° C. by measuring the time required for 96 ml. of the juice to pass through the 3.3 mm. (I.D.) orifice of a 100-ml. pipette. Consistency (Pipette 2) was determined in the same manner but employing a pipette with a larger orifice, namely, 3.8 mm. I.D.

In the above runs, the original juice used as the heat source carried over into the product so that each product contained 1/3 part by weight of the original juice to 2/3 part by weight of the acid-blended material. It is evident that in continuous operation wherein the original juice would be applied merely to start the operation and the fresh material were added over a considerable period of time with constant withdrawal of product, the effect of the original juice would be gradually eliminated. The end result would be, of course, that the system would attain a steady state wherein the products would exhibit higher consistencies than those obtained in the above laboratory runs.

Having thus described the invention, what is claimed is:

1. A process for preparing tomato juice of increased consistency which comprises macerating tomatoes in the presence of added non-toxic acid in an amount to provide a pH less than 3.5 and extracting the juice from the resulting macerate.

2. The process of claim 1 wherein the acid is hydrochloric acid.

3. The process of claim 1 wherein the acid is hydrochloric acid in an amount to provide a pH of about 2.5 to 3.

4. The process of claim 1 wherein the acid is sulphuric acid.

5. The process of claim 1 wherein the acid is citric acid.

6. The process of claim 1 wherein the acid is orthophosphoric acid.

7. The process of claim 1 wherein the acid is metaphosphoric acid.

8. The process of claim 1 wherein heat is applied during the maceration to bring the macerate to a temperature of at least 185° F.

9. The process of claim 1 wherein the macerate is neutralized to its natural pH by addition of non-toxic alkaline material, prior to extraction of the juice therefrom.

10. The process of claim 1 wherein the juice is neutralized to its natural pH by addition of non-toxic alkaline material.

11. The process of claim 1 wherein the juice is blended with a different juice of lesser consistency to provide a composite juice of desired intermediate consistency.

12. A method for preparing high-consistency tomato juice which comprises applying hydrochloric acid, in an amount to provide a pH of about 2.5 to 3, to raw tomatoes in a condition in which the tissue is largely in its natural orginized state, applying maceration and concomitant heating to the mixture of tomatoes and added acid, continuing the maceration until there is produced a uniform intimate blend of comminuted tomato material and acid, then without any substantial delay neutralizing the said blend to a pH of about 3.8–4.2 and extracting the juice therefrom.

13. A method for preparing high-consistency tomato juice which comprises:
  (A) providing a pool of macerated tomato material at a temperature of about 200° F.
  (B) continuously feeding raw tomatoes into said pool,
  (C) concomitantly feeding hydrochloric acid into said pool in an amount to maintain the macerate at a pH of about 2.5 to 3.0,
  (D) continuously maintaining the temperature of the pool at about 200° F. and continuously applying macerating action thereto,
  (E) continuously withdrawing a portion of the macerated material from the pool,
  (F) neutralizing the withdrawn material to a pH of about 3.8 to 4.2, and
  (G) extracting the juice therefrom.

References Cited

UNITED STATES PATENTS

| | | | |
|---|---|---|---|
| 2,928,744 | 3/1960 | Ponting | 99—105 |
| 2,434,388 | 1/1958 | Brehm | 99—154 |
| 2,291,704 | 8/1942 | Fisher | 99—154 |

OTHER REFERENCES

Tressler et al.: Fruit and Vegetable Juices, AVI Pub. Co., 1939, pp. 300–313.

Food Technology, "Effect of Tomato Cell Structure on Consistency of Tomato Juice," vol. 11, pp. 19–22, 1957.

A. LOUIS MONACELL, *Primary Examiner.*

M. VOET, *Assistant Examiner.*